United States Patent
Nair

(10) Patent No.: US 10,123,210 B2
(45) Date of Patent: Nov. 6, 2018

(54) SYSTEM AND METHOD FOR DYNAMIC ACTIVATION AND DEACTIVATION OF USER PLANE INTEGRITY IN WIRELESS NETWORKS

(71) Applicant: Alcatel-Lucent USA Inc., Murray Hill, NJ (US)

(72) Inventor: Suresh P. Nair, Whippany, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/462,519

(22) Filed: Mar. 17, 2017

(65) Prior Publication Data
US 2018/0270668 A1  Sep. 20, 2018

(51) Int. Cl.
  *H04W 12/10* (2009.01)
  *H04L 29/06* (2006.01)
  *H04W 76/10* (2018.01)

(52) U.S. Cl.
  CPC ........... *H04W 12/10* (2013.01); *H04L 63/123* (2013.01); *H04W 76/10* (2018.02)

(58) Field of Classification Search
  CPC ...... H04W 12/10; H04W 76/02; H04L 63/123
  See application file for complete search history.

(56) References Cited

U.S. PATENT DOCUMENTS

| | | | |
|---|---|---|---|
| 8,483,090 B2 | 7/2013 | Yi et al. | |
| 8,879,732 B2 | 11/2014 | Jokinen et al. | |
| 9,301,147 B2 | 3/2016 | Zhang et al. | |
| 9,497,169 B2 | 11/2016 | Baghel et al. | |
| 2007/0153793 A1* | 7/2007 | Jiang | ..................... H04L 1/1867 370/390 |
| 2007/0155339 A1* | 7/2007 | Jiang | ..................... H04L 63/123 455/73 |

(Continued)

FOREIGN PATENT DOCUMENTS

| | | |
|---|---|---|
| EP | 2608623 A1 | 6/2013 |
| WO | WO2015139298 | 9/2015 |

OTHER PUBLICATIONS

3GPP. "3rd Generation Partnership Project; Technical Specification Group Services and System Aspects; Policy and charging control architecture (Release 12)". 3GPP TS 23.203 V12.11.0 (Dec. 2015).

(Continued)

*Primary Examiner* — Nathan Mitchell
(74) *Attorney, Agent, or Firm* — Loza & Loza, LLP; Jessica W. Smith

(57) ABSTRACT

User equipment (UE) and a network node may establish data radio bearers (DRBs) for wireless communication of user plane data. For each DRB, the UE and network node may signal static or dynamic integrity protection for the user plane data during set-up of the DRB. When the DRB has static integrity protection, integrity protection is applied to the user plane data for a duration of the DRB. When the DRB has dynamic integrity protection, the UE and network node establish one or more trigger conditions for dynamic integrity protection of the DRB. The integrity protection may be enabled upon detection of one or more trigger conditions and disabled when the one or more trigger conditions subside after a predetermined period of time.

19 Claims, 12 Drawing Sheets

(56) References Cited

U.S. PATENT DOCUMENTS

| | | | | |
|---|---|---|---|---|
| 2008/0120728 A1* | 5/2008 | Jiang | ............... | H04L 63/123 726/30 |
| 2009/0147951 A1* | 6/2009 | Kuo | ............... | H04W 12/04 380/44 |
| 2009/0320100 A1* | 12/2009 | Kitazoe | ............... | H04L 1/1607 726/3 |
| 2011/0312299 A1* | 12/2011 | Patil | ............... | H04L 63/20 455/410 |
| 2012/0202491 A1* | 8/2012 | Fox | ............... | H04B 7/2609 455/435.1 |
| 2012/0289220 A1* | 11/2012 | Yang | ............... | H04L 63/123 455/422.1 |
| 2012/0315878 A1* | 12/2012 | Deng | ............... | H04W 12/10 455/411 |
| 2013/0210384 A1 | 8/2013 | Zhang | | |
| 2013/0236016 A1* | 9/2013 | Zhang | ............... | H04W 12/02 380/270 |
| 2015/0085749 A1* | 3/2015 | Eravelli | ............... | H04L 69/24 370/328 |

OTHER PUBLICATIONS

3GPP. "3rd Generation Partnership Project;Technical Specification Group Services and System Aspects; System Architecture for the 5G System; Stage 2 (Release 15)". 3GPP TS 23.501 V0.3.1 (Mar. 2017).

3GPP. "3rd Generation Partnership Project;Technical Specification Group Services and System Aspects; 3GPP System Architecture Evolution (SAE): Security Architecture (Release 8)". 3GPP TS 33.401 V8.3.1 (Mar. 2009).

3GPP. "3rd Generation Partnership Project;Technical Specification Group Services and System Aspects; Study on battery efficient security for very low throughput machine type communication (MTC) devices (Release 14)". 3GPP TR 33.863 V14.0.0 (Sep. 2016).

3GPP. 3rd Generation Partnership Project; Technical Specification Group Services and System Aspects; Study on the security aspects of the next generation system (Release 14). 3GPP TR 33.899 V0.6.0 (Nov. 2016).

Nokia: "Up integrity protection—solution for negotiation per bearer." 3rd Generation Partnership Project (3GPP) Draft, S3-170659. Mobile Competence Center, Sophia-Antipolis Cedex, France (Mar. 20, 2017).

3GPP. "3rd Generation Partnership Project; Technical Specification Group Services and System Aspects: Study on EGPRS access security enhancements with relation to cellular Iot (Release 13)." 3GPP draft S3-160292_TR_33860_V050_RM; Mobile Competence Center, Sophia-Antipolis Cedex, France (Feb. 7, 2016).

3GPP. "3rd Generation Partnership Project; Technical Specification Group Services and System Aspects: study on the security aspects of the next generation system (Release 14)". 3GPP draft, S3-171583-V2-33899-120-RM Mobile Competence Center, Sophia-Antipolis Cedex, France (Jun. 21, 2017).

PCT/US2018/021684. International Search Report & Written Opinion (dated Jul. 4, 2018).

* cited by examiner

SYSTEM AND METHOD FOR DYNAMIC ACTIVATION AND DEACTIVATION OF USER PLANE INTEGRITY IN WIRELESS NETWORKS

TECHNICAL FIELD

This application relates generally to integrity protection of wireless transmissions and more specifically to selective user plane integrity protection of wireless transmissions.

DESCRIPTION OF RELATED ART

In general, legacy wireless networks provide no integrity protection of user plane data. Though user plane data (in most countries) may be encrypted, this encryption still provides very limited protection against certain attacks. For example, a "Man-In-The-Middle" attack may alter the encrypted data or insert invalid data. UMTS and LTE include cryptographic integrity protection for control signaling messages but not for user plane data.

One proposed solution is to provide bearer level integrity (as considered in 3GPP Technical Report TR 33.863, Version 14, dated Sep. 28, 2017 and entitled, "Feasibility Study on New Services and Markets Technology Enablers—Enhanced Mobile Broadband"). However, this proposed solution fails to protect against quantities of rogue data inserted into a mobile connection (either to increase subscriber bills or to waste resources carrying the data to the service end-point). Another solution described in U.S. Pat. No. 8,879,732 involves a dynamic ciphering mode, but fails to describe integrity protection and particularly enabling and disabling integrity checking. The use of Message Authentication Codes is another proposed solution but is only appropriate for packets that should be received with no errors (e.g., after any error correction).

In the low power wide area network solutions for Internet of Things (IoT) tailored GPRS (described in 'Enhanced-Coverage GSM', 3GPP Release-13), user plane integrity protection was added, partly due to different security threats for user plane data in low power, Machine-to-Machine (M2M) platform of IoT applications. For user plane data integrity protection of LTE, adding another layer of integrity on the radio interface may conflict with performance constraints (such as latency and battery life).

Therefore, a need exists to provide an improved system and method to configure integrity protection for a single DRB (e.g. on a per DRB basis) and to dynamically enable or disable integrity protection of user plane data on per flow or application basis.

SUMMARY

Disclosed herein are various embodiments of apparatus and methods that may be beneficially applied to, e.g., integrity protection of user plane data in data radio bearers. While such embodiments may be expected to provide improvements in security relative to conventional implementations, no particular result or improvement is a requirement unless explicitly recited in a particular claim.

In an embodiment, user equipment (UE) includes a wireless transceiver configured to communicate with a network node and a processing circuitry including at least one processing device and at least one memory device. The processing circuitry establishes a data radio bearer (DRB) with the network node for wireless communication of user plane data over the DRB and determines whether to enable static integrity protection for the DRB for a duration of the DRB. When static integrity protection is determined, integrity protection for a duration of the DRB is enabled, and when static integrity protection is not determined, one or more trigger conditions for dynamic integrity protection of the DRB is enabled. When the processing circuitry is configured to enable dynamic integrity protection of the DRB, it may detect at least one of the trigger conditions in the DRB and transmit a request for integrity protection of the DRB from the network node. The UE then receives the user plane data over the DRB, wherein the integrity protection has been applied to the user plane data.

In another embodiment, user equipment (UE) includes a wireless transceiver configured to communicate with a network node and processing circuitry including at least one processing device and at least one memory device. The processing circuitry establishes a data radio bearer (DRB) with the network node for wireless communication of user plane data over the DRB, wherein one or more trigger conditions are associated with the DRB and transmit the user plane data over the DRB. The processing circuitry then receives a request for integrity protection of the DRB from the network node and applies an integrity protection algorithm to the user plane data. The user plane data is transmitted to the network node including integrity protection over the DRB. The processing circuitry may further receive a request for disabling integrity protection of the DRB from the network node and disable the integrity protection of the user plane data over the DRB to the network node.

A network node, such as an eNodeB or other type of network node, includes a wireless transceiver configured to communicate with a user equipment (UE) and processing circuitry including at least one processing device and at least one memory device. The processing circuitry may set up a data radio bearer (DRB) with the UE for wireless communication of user plane data over the DRB, wherein DRB has an associated one or more trigger conditions for dynamic integrity protection of the DRB. The network node further monitors the DRB for one or more of the trigger conditions and detects at least one of the trigger conditions in the DRB. The network node then transmits a request to the UE for integrity protection of the DRB and receives the user plane data over the DRB, wherein the integrity protection has been applied to the user plane data. The network node may further determine that the at least one of the trigger conditions has subsided for a predetermined time period for the DRB and transmit a request to the UE for disablement of the integrity protection of the DRB.

A network node includes a wireless transceiver configured to communicate with user equipment (UE) and processing circuitry including at least one processing device and at least one one memory device. The processing circuitry is configured to establish a data radio bearer (DRB) with the UE for wireless communication of user plane data over the DRB, wherein one or more trigger conditions are associated with the DRB and transmit the user plane data over the DRB. The processing circuitry may receive a request for integrity protection of the DRB from the UE; apply an integrity protection algorithm to the user plane data; and transmit the user plane data including the integrity protection over the DRB to the UE. The processing circuitry may further receive a request for disabling the integrity protection of the DRB from the UE and disable the integrity protection of the user plane data.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Figure 1:
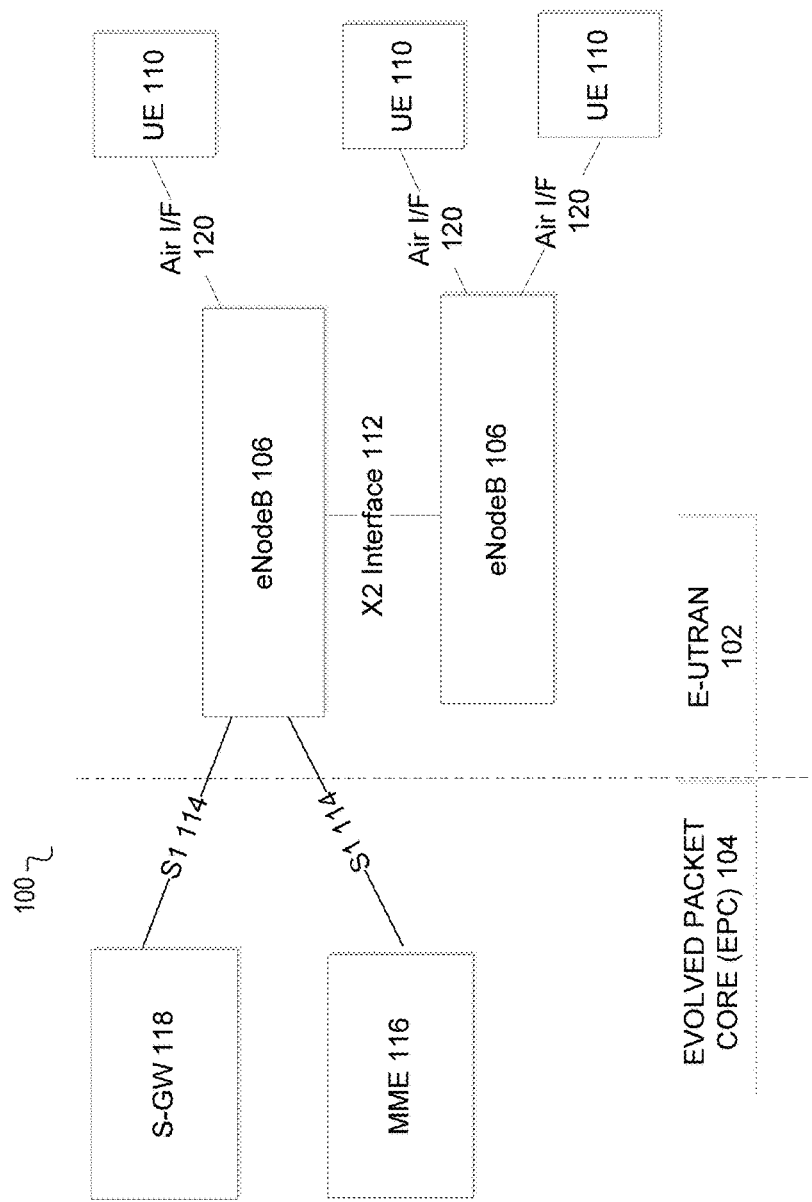
FIG. 1 illustrates a schematic block diagram of an embodiment of an exemplary wireless network.

FIG. 1 illustrates a schematic block diagram of an embodiment of an exemplary wireless network 100. Embodiments described herein may be implemented in various types of wireless networks including, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A) or other wireless networks. In one implementation in which the network is an LTE type network, the overlay access network includes an evolved Universal Terrestrial Radio Access Network (E-UTRAN) 102 connected to an evolved packet core (EPC) 104. The E-UTRAN 102 includes at least one Universal Terrestrial Radio Access Network (UTRAN) node B or eNodeB or eNB 106. The eNodeBs are interconnected with each other by means of an X2 interface 112.

The eNodeBs are also connected by means of an S1 interface 114 to the EPC 104, and e.g., more specifically to a Mobility Management Entity (MME) 116 by means of the S1-MME protocol, to a Serving Gateway (S-GW) 118 by means of the S1-U protocol. The MME 116 is a main control node for the LTE access-network. The S-GW 118 routes and forwards user data packets, while also acting as the mobility anchor for the user plane during inter-eNodeB handovers.

The eNodeBs 106 provide an air interface (I/F) 120 to user equipment (UE) 110 including E-UTRA user plane (PDCP/RLC/MAC/PHY) protocols and radio resource control (RRC) protocols. The eNodeBs 106 are configured to perform radio resource management (RRM) functions as well as radio bearer control, radio admission control, connection mobility control, dynamic allocation of resources to UEs 110 in both uplink and downlink (scheduling). In other embodiments, a radio access network (RAN) may include a separate base transceiver station (BTS) and radio network controller (RNC) and perform similar functions as described herein with respect to an eNodeB 106. Thus, a base station (BS), base transceiver station (BTS) or any type of RAN controller may perform the same or similar functions as described herein with respect to an eNodeB 106.

Figure 2:
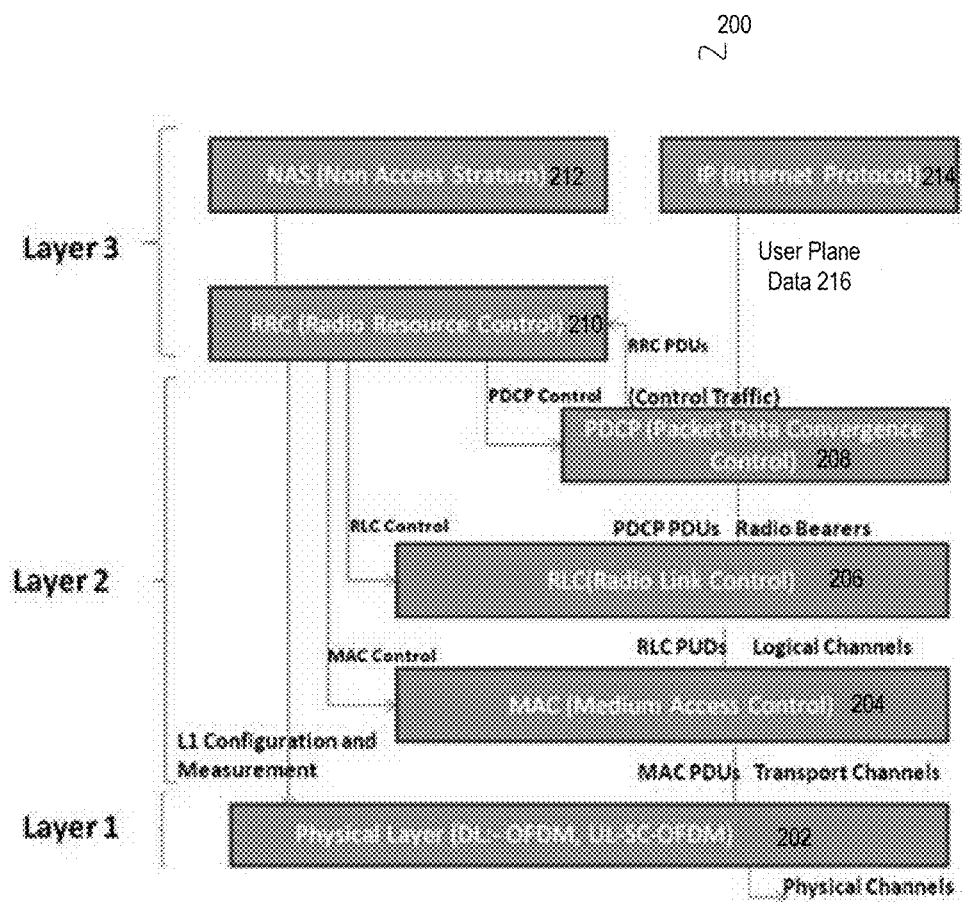
FIG. 2 illustrates a schematic block diagram of an embodiment of a protocol stack in a wireless network.

FIG. 2 illustrates a schematic block diagram of an embodiment of a protocol stack 200 in a wireless network 100. The protocol stack 200 illustrated herein is generally associated with the E-UTRAN 102 though other protocol stacks including similar or additional protocols or layers may also be implemented in embodiments described herein.

The protocol stack 200 includes at least three layers, Layer 1, Layer 2 and Layer 3. Layer 1 (L1) includes the Physical Layer 202. The Physical Layer 202 carries information from the MAC transport channels over the air interface and handles link adaptation (AMC), power control, cell search (for initial synchronization and handover purposes) and other measurements (inside the LTE system and between systems) for the radio resource control (RRC) layer 210.

The Layer 2 (L2) includes a medium access control (MAC) sublayer 204, radio link control (RLC) sublayer 206 and packet data convergence protocol (PDCP) 208. The MAC sublayer 204 manages a set of logical channels for the RLC sublayer 206 that it multiplexes into the physical layer transport channels. The MAC layer 204 also manages error correction, prioritization of the logical channels and dynamic scheduling between UEs 110, etc. The RLC sublayer 206 manages the transport of the PDCP's PDUs over the data radio bearers and may operate in different modes to provide different types of reliability. The different modes may provide: ARQ error correction, segmentation/concatenation of PDUs, reordering for in-sequence delivery, duplicate detection, etc. The PDCP 208 provides transport of control data for the RRC sublayer 210 and transport of user plane data, e.g. for the IP layer 214. The PDCP performs header compression, integrity protection, ciphering, and depending on the RLC mode, in-sequence delivery, duplicate detection and retransmission of PDUs during handover.

The Layer 3 (L3) includes an RRC layer 210. The RRC layer 210 manages broadcast system information related to the access stratum and transport of the non-access stratum (NAS) messages, paging, establishment and release of the RRC connection, security key management, handover, UE measurements related to inter-system (inter-RAT) mobility, QoS, etc. Interfacing layers to the E-UTRAN protocol stack include the non-access stratum (NAS) 212 and IP layer 214. The NAS 212 handles the protocol between the UE 110 and the MME 108 on the network side and performs authentication of the UE 110, security control and generates part of paging messages. The IP layer 214 or application layer generates the user plane data 216 included in the PDCP protocol data units (PDUs).

Figure 3:
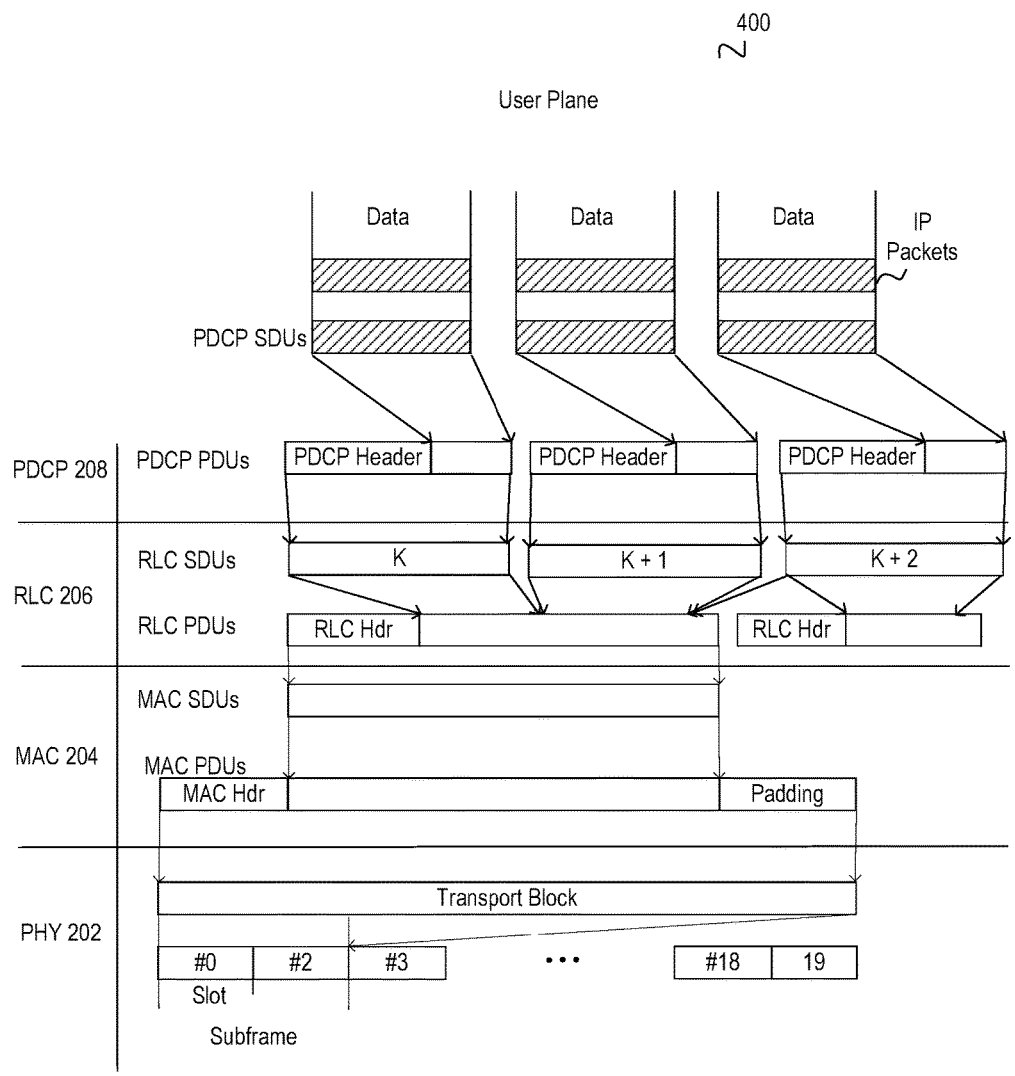
FIG. 3 illustrates a schematic block diagram of an embodiment of user plane data flow in the protocol stack.

FIG. 3 illustrates a schematic block diagram of an embodiment of user plane data flow in the protocol stack 200. In general, packets received by a layer in the protocol stack are called Service Data Units (SDUs) while the packets that are output from a layer are referred to as Protocol Data Units (PDUs). The IP Layer 214 submits IP Packets (PDCP SDUs) to the Packet Data Convergence Protocol (PDCP) layer 208. The PDCP layer 208 performs header compression and adds PDCP headers to these PDCP SDUs. PDCP Header Compression includes removal by the PDCP layer 208 of the IP header (i.e., a minimum 20 bytes) which provides a tremendous savings in the amount of data that would otherwise be transmitted over the air interface. The PDCP Layer 208 submits the PDCP PDUs (RLC SDUs) to the RLC layer 206.

The RLC layer 206 performs segmentation of these SDUS into the RLC PDUs. For example, when an RLC SDU is large, or the available radio data rate is low (resulting in small transport blocks), the RLC SDU may be split among several RLC PDUs. If the RLC SDU is small, or the available radio data rate is high, several RLC SDUs may be packed into a single RLC PDU. The RLC layer 206 adds a header based on the RLC mode of operation. The RLC layer 206 then submits these RLC PDUs (MAC SDUs) to the MAC layer 204.

The MAC layer 204 adds a header and performs padding to fit the MAC SDU into a physical transport block. The MAC layer 204 submits the MAC PDU to the physical layer 202 for transmitting it onto physical channels. The physical channels transmit the MAC PDU or transport block into slots of a sub frame.

Overview

When integrity protection is enabled for the user plane (UP) data, the processing load increases. Since the integrity protection may be in addition to encryption, enabling both may consume considerable processing resources. If integrity checking every user packet is done in addition to ciphering/deciphering, it is costly in terms of processor overhead. Hence integrity protection for user plane data should preferably be enabled only for certain data radio bearers (DRB) which need it. Also, even when integrity protection is enabled, it may not be needed for the duration of the life of the DRB. Thus, it is ideal to enable integrity protection dynamically, e.g. only when required for certain DRBs carrying a particular data flow or application. A practical compromise is to enable the integrity protection for a particular DRB when the radio conditions of the DRB are unacceptable, or the receiver suspects a threat condition, such as packet injection in the path. So, the receiver may dynamically activate integrity protection based on trigger conditions. A mechanism may also be used to signal the other peer to revert back to normal transmission without integrity protection when the threat conditions subside or radio conditions improve. In addition, integrity protection may be requested for certain data flows for the duration of the bearer channel.

In an embodiment, the UE and/or eNB are configured to detect one or more trigger conditions for integrity protection of a data radio bearer (DRB). The trigger conditions may include indications of a threat to user plane data, such as an unauthorised insertion of rogue data onto an established data radio bearer, or unacceptable bit error rates or any other trigger conditions defined and given by lower layer protocol layers. In response to detection of one of the trigger conditions, the UE and/or eNB may then dynamically enable PDCP integrity protection on the DRB.

In another embodiment, the UE and/or eNB are configured to request integrity protection for user plane data upon set-up of a data radio bearer (DRB). The integrity protection of the DRB will remain throughout the duration of the DRB. For example, it may be desired to have integrity protection for certain data flows, such as IoT.

Figure 4:
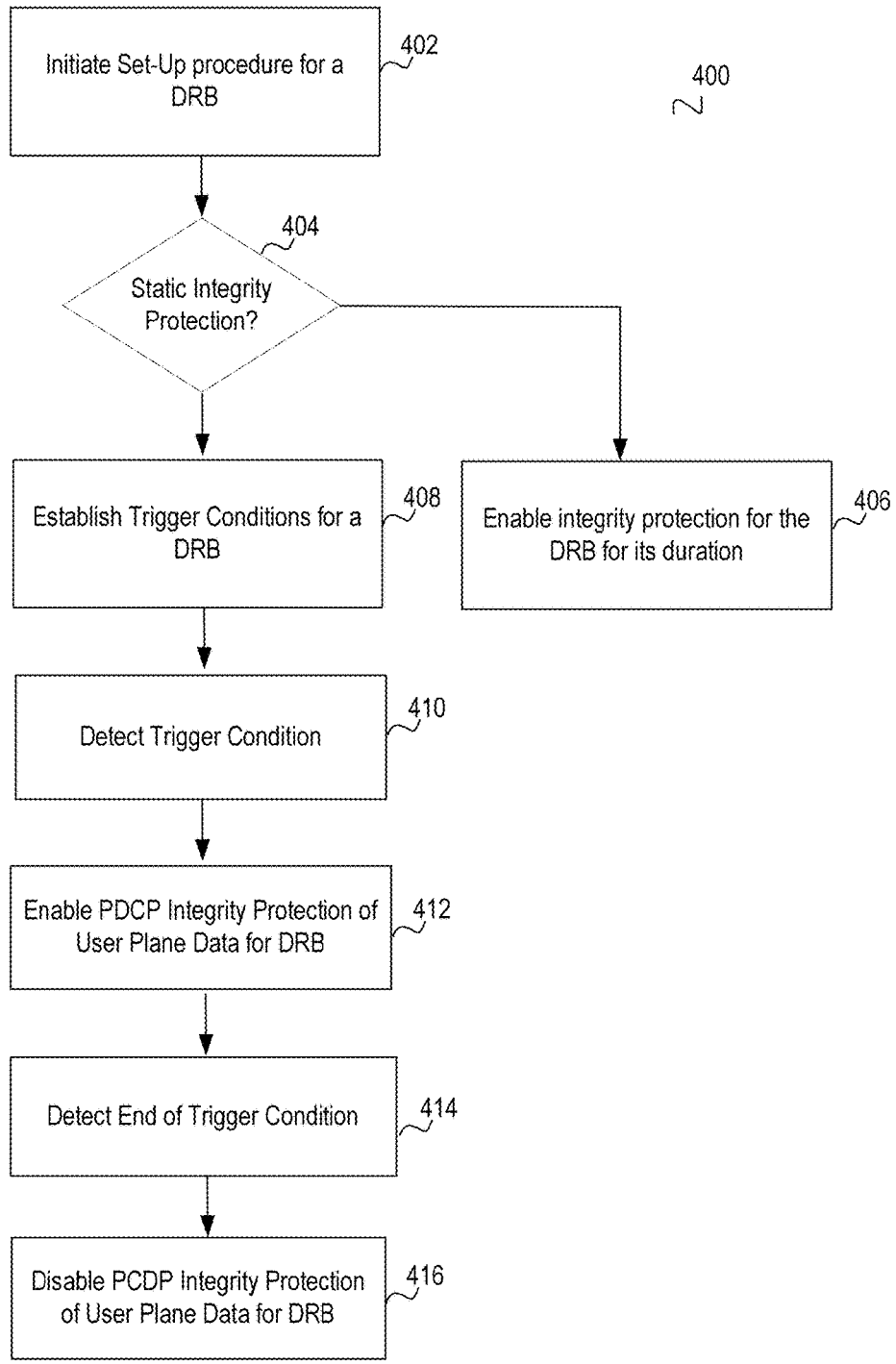
FIG. 4 illustrates a logical flow diagram of an embodiment of a method for dynamic integrity protection of user plane data in a data radio bearer.

FIG. 4 illustrates a logical flow diagram of an embodiment of a method 400 for integrity protection of user plane data in a data radio bearer (DRB). In 402, the set-up procedure for a particular DRB is initiated. During the set-up of the DRB, it is determined whether integrity protection is enabled for that particular DRB. For example, integrity protection may be enabled on a per DRB basis. When enabled, the integrity protection may be enabled for the duration of the DRB at 404. For example, the UE 110 or eNB 106 may signal or request static integrity protection for the DRB during set-up. If static integrity protection is indicated, then the integrity protection for the DRB is enabled for the duration of the DRB, e.g. until its end of life at 406. For example, integrity protection may be requested and enabled for the duration of a particular DRB carrying certain types of services or data, such as IoT type data. The UE and eNB may thus signal to enable static integrity protection for only certain or particular DRBs during the DRB set-up.

If static integrity protection is not requested or enabled for a duration or life of the DRB during the set-up procedure, then integrity protection may be enabled dynamically for the DRB upon detection of one or more trigger conditions. Trigger conditions for the data bearer channel (DRB) must then be established, e.g. during set-up of the DRB, at 408. The trigger conditions may be specified during the set-up procedure or may be predefined depending on the QCI of the DRB.

For dynamic integrity protection, the DRB is monitored for one or more of the trigger conditions. For an uplink RRC, the eNB 106 monitors for a trigger condition while the UE 110 monitors a downlink RRC. In 410, one or more trigger conditions are detected. In response, in 412, PDCP integrity protection is enabled, e.g. using an RRC connection reconfiguration procedure. The PDCP layer at the transmission end then inserts integrity protection, such as a checksum, into the PDCP PDUs. The PDCP layer at the receiving end may then verify the PDCP PDUs using the integrity protection.

The monitoring of the DRB continues during the PDCP integrity protection. In 414, it is detected that the one or more trigger conditions end or subside. In response, the PDCP integrity protection of the DRB is disabled, e.g. using an RRC connection reconfiguration procedure at 416.

The PDCP integrity protection is thus statically or dynamically enabled for a particular DRB during the set-up procedure for the DRB. For dynamic integrity protection, the DRB is monitored and integrity protection is enabled or disabled based on detected real time conditions or attacks. Appropriate trigger conditions may be defined for enablement of the dynamic integrity protection based on characteristics of the DRB (such as QCI of the DRB). The PDCP integrity protection may then be disabled dynamically to reduce unnecessary consumption of resources when trigger conditions subside.

The UE and/or eNB thus determine on a per DRB basis whether the DRB needs integrity protection. The UE and eNB may determine whether the integrity protection needed is static or dynamic. In the case of static integrity protection, protection is applied for the life of DRB. For dynamic integrity protection, one or more trigger conditions may be configured on a per DRB basis, e.g., the trigger conditions are established for the DRB based on one or more characteristics of the DRB.

Embodiment—Establishment of Trigger Conditions

The trigger conditions to enable or disable PDCP integrity protection may be defined per data radio bearer or data flow. Reliable trigger conditions for activation of the PDCP integrity protection are needed by the receiving entity (e.g., UE, eNB). Hence new PDCP operational triggers are defined to dynamically initiate integrity protection as well as to disable integrity protection.

In some current wireless networks, various levels of quality of Service (QoS) are defined and assigned a QoS Class Identifier (QCI) value. For example, different types of data may need different levels of QoS. For example, the QCI value determines a priority of the data packets, maximum allowed delay for the data packet, acceptable packet loss, etc. The 3GPP Technical Specification TS23.203, Version 12.11.0, dated December 2015, entitled, "Policy and Charging Control Architecture", which is hereby incorporated by reference herein, defines values and characteristics associated with QCI values. For example, a QCI value is associated with a priority level, wherein Priority level 0.5 is the highest Priority level. Table 1 below provides an example of defined QCI values and associated resource type, priority level, packet delay budget, packet error loss and example services.

TABLE 1

Definition of QCI values

| QCI Value | Resource Type | Priority Level | Packet Delay Budget | Packet Error Loss | Example Services |
|---|---|---|---|---|---|
| 1 | GBR | 2 | 100 ms | 10-2 | Conversational Voice |
| 2 | GBR | 4 | 150 ms | 10-3 | Conversational Video |
| 3 | GBR | 3 | 50 ms | 10-3 | Real Time Gaming |
| 4 | GBR | 5 | 300 ms | 10-6 | Non-Conversational Video (Buffered Streaming) |
| 65 | GBR | 0.7 | 75 ms | 10-2 | Mission Critical user plane Push To Talk voice (e.g., MCPTT) |
| 66 | GBR | 2 | 100 ms | 10-2 | Non-Mission-Critical user plane Push To Talk voice |
| 5 | non-GBR | 1 | 100 ms | 10-6 | IMS Signaling |
| 6 | non-GBR | 6 | 300 ms | 10-6 | Video (Buffered Streaming) TCP-Based (for example, www, email, chat, ftp, p2p and the like) |
| 7 | non-GBR | 7 | 100 ms | 10-3 | Voice, Video (Live Streaming), Interactive Gaming |
| 8 | non-GBR | 8 | 300 ms | 10-6 | Video (Buffered Streaming) TCP-Based (for example, www, email, chat, ftp, p2p and the like) |
| 9 | non-GBR | 9 | 300 ms | 10-6 | Video (Buffered Streaming) TCP-Based (for example, www, email, chat, ftp, p2p and the like). Typically used as default bearer |
| 69 | non-GBR | 0.5 | 60 ms | 10-6 | Mission Critical delay sensitive signaling (e.g., MC-PTT signaling) |
| 70 | non-GBR | 5.5 | 200 ms | 10-6 | Mission Critical Data (e.g. example services are the same as QCI 6/8/9) |

In an embodiment, the QCI values may be used to establish trigger conditions for PDCP integrity protection. During set-up of an RRC connection, a QCI value is associated with the DRB based on the type of service. The eNB and the UE translate the QCI value associated with the DRB into scheduling parameters, admission policies, queue management thresholds, link layer protocol configurations, etc. When a "Man-in-the-Middle" data attack occurs, such as an external spurious packet injection on a DRB, typically these values are violated. For example, such an attack may result in a higher packet arrival rate than normal, higher packet counts, a varying packet arrival rate, a varying packet size, etc. These parameters may be used as triggers to enable integrity protection by the transmission side of the DRB and filtering at the receiver side of the DRB. In addition to packet monitoring at the PDCP layer, other lower RLC and MAC sublayers may also have defined trigger conditions, e.g. relating to detecting the erratic nature of received packets or unacceptable radio conditions. The RLC or MAC sublayers may also then trigger PDCP integrity protection when such trigger conditions are defined and detected.

In another embodiment, an unacceptable bit error rate may trigger PDCP integrity protection. Bit errors are common in wireless transmissions, and some user plane data is still valuable when received with a low bit error rate. For instance, voice and video codecs tend to be error tolerant and error correction may be implemented at a higher layer. Thus, a low bit error rate should not always trigger integrity protection. The bit error rate for triggering integrity protection may be set depending on the QCI value for the DRB.

Figure 5:
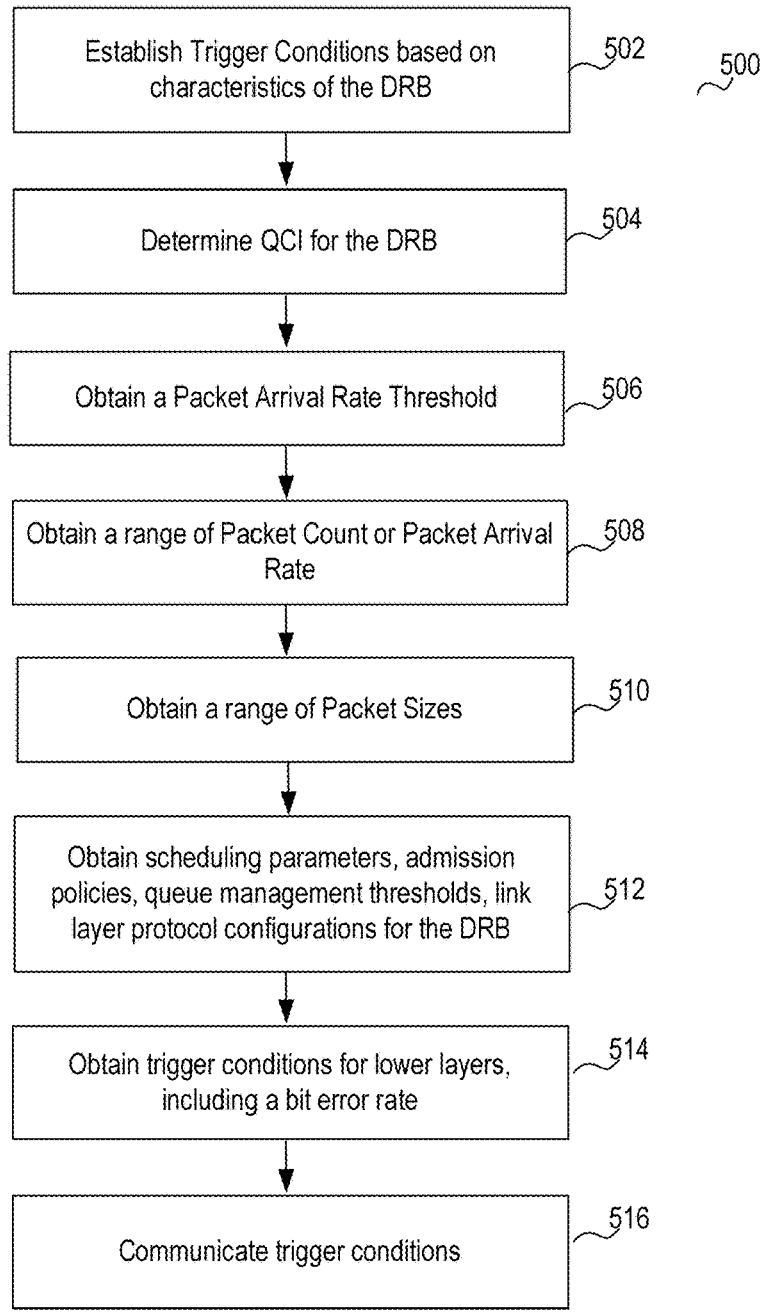
FIG. 5 illustrates a logical flow diagram of an embodiment of a method for establishing trigger conditions for integrity protection in a data radio bearer.

FIG. 5 illustrates a logical flow diagram of an embodiment of a method 500 for establishing trigger conditions for integrity protection in a data radio bearer. During set up of a data radio bearer (DRB), it is determined whether integrity protection is necessary for the duration of the DRB. If so, integrity protection is enabled at set-up and continues until the DRB end of life. For example, it may be desired that integrity protection is enabled for the duration of a DRB carrying IoT type data. Thus, static integrity protection is decided on a per DRB basis at set up of the DRB.

If static integrity protection is not enabled for a duration of the DRB, then integrity protection is enabled dynamically for the DRB upon detection of one or more trigger conditions. The trigger conditions must then be determined for the DRB. In one embodiment, the trigger conditions for a DRB are established based on the characteristics of the DRB in 502.

For example, the trigger conditions may be determined using the QCI value assigned to the DRB. In 504, the QCI assigned to the DRB is determined. Based on the QCI or other DRB characteristic, a packet arrival rate threshold is obtained in 506. For example, the packet arrival rate threshold is set at a rate that would indicate unauthorized insertion of extra packets or other attacks. The PDCP integrity protection may then be enabled in response to the packet arrival rate exceeding the threshold. In 508, a range of packet counts or packet arrival rates is obtained using the QCI or other characteristic of the DRB. The ranges include a normal variance expected for the type of traffic for the QCI of the DRB. When the packet count or packet arrival rate varies from the expected range, the PDCP integrity protection may then be enabled. In 510, a range of expected packet sizes is obtained based on the QCI or other characteristic of the DRB. In another embodiment, the packet arrival rate, packet count and packet sizes may be monitored on the DRB for a predetermined time to obtain an average or mean of the measurements. A predetermined variance from the average or mean packet arrival rate, packet counts or packet sizes may then indicate a trigger condition.

In 512, the QCI of the DRB indicates certain parameters, such as scheduling parameters, admission policies, queue management thresholds and link layer protocol configurations. These measurements are obtained and any variance from these parameters indicated by the QCI may also be trigger conditions.

In 514, other trigger conditions measured by lower layers, such as the RLC layer 206, MAC layer 204 or physical layer 202 may be obtained. For example, unacceptable bit error rates or a threshold of retransmission of packets may be trigger conditions. The trigger conditions are then communicated between the receiving and transmitting entities for the DRB in 516.

Trigger conditions are thus established on a per DRB or flow basis and are determined using one or more characteristics of the DRB, such as the QCI assigned to the DRB.

Figure 6:
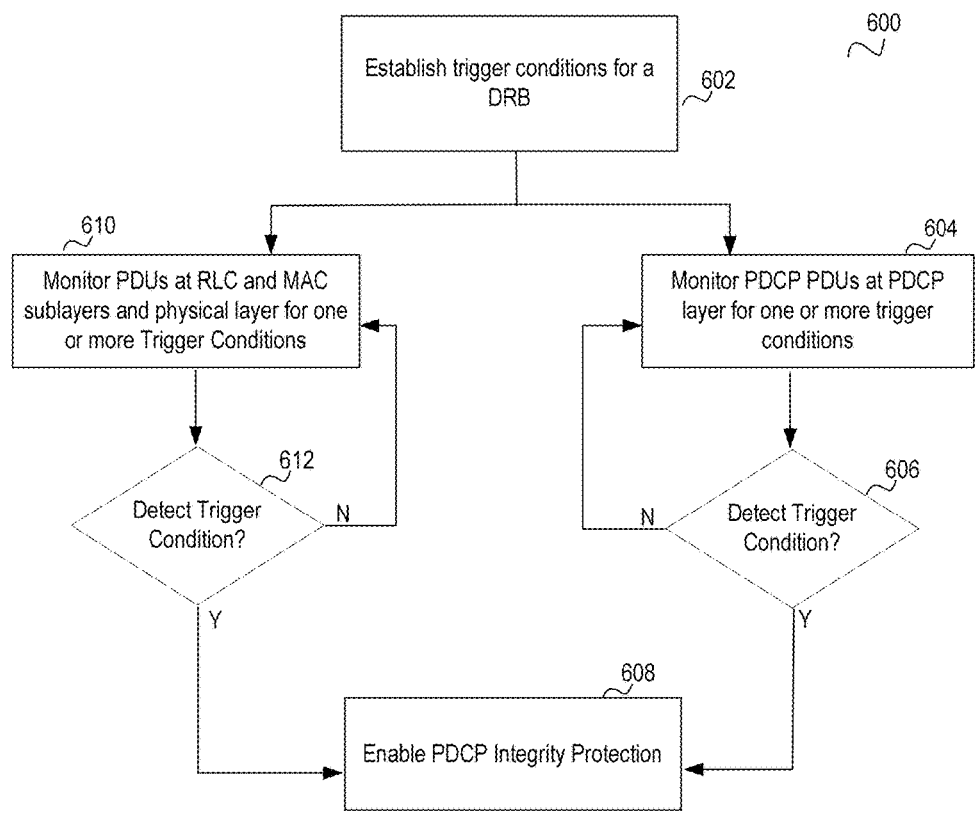
FIG. 6 illustrates a logical flow diagram of an embodiment of a method for enabling Packet Data Convergence Protocol (PDCP) integrity protection for a data radio bearer.

FIG. 6 illustrates a logical flow diagram of an embodiment of a method 600 for enabling PDCP integrity protection for a data radio bearer. In 602, trigger conditions are established for a particular DRB and communicated between the UE 110 and eNB 106. In 604, the PDCP PDUs are monitored at the PDCP layer for one or more trigger conditions. For example, in an uplink DRB, the incoming PDCP PDUs at the PDCP layer are monitored by the eNB 106 while in a downlink DRB, the incoming PDCP PDUs of the PDCP layer are monitored by the UE 110. In 606, it is determined whether one or more trigger conditions are detected. If so, PDCP integrity protection is enabled in 608 for the DRB. If not, then monitoring continues in 604.

In addition, lower layers may also be monitored for trigger conditions in 610. For example, the respective channels or PDUs for the RLC sublayer 206, the MAC sublayer 204 and/or the physical layer 202 may be monitored for trigger conditions. In 612, it is determined whether one or more trigger conditions are detected in the lower layers. If so, PDCP integrity protection is enabled in 608 for the DRB. If not, then monitoring at the lower layers continues in 610.

Figure 7:
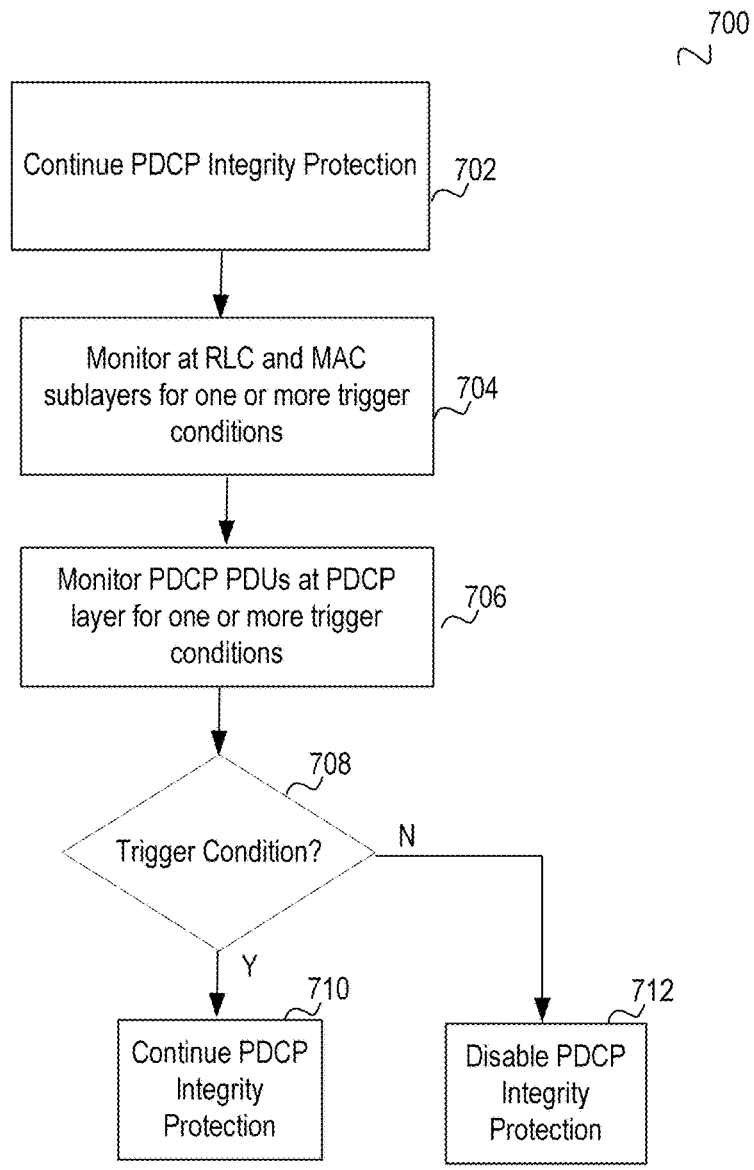
FIG. 7 illustrates a logical flow diagram of an embodiment of a method for disabling PDCP integrity protection for a data radio bearer.

FIG. 7 illustrates a logical flow diagram of an embodiment of a method 700 for disabling PDCP integrity protection for a data radio bearer. In 702, PDCP integrity protection is enabled and continues. The respective channels or PDUs for the RLC sublayer 206, the MAC sublayer 204 and/or the physical layer 202 are monitored for one or more trigger conditions at 704. The incoming PDCP PDUs at the PDCP layer are monitored for trigger conditions as well at 706. At 708, it is determined if one or more trigger conditions are still present. If yes, the PDCP integrity protection is continued at 710. If no, the PDCP integrity protection may be disabled at 712. For example, it may be determined that the no trigger conditions may be detected for a predetermined period of time prior to disabling PDCP integrity protection. This waiting period of no trigger conditions prevents disabling and subsequent enabling of PDCP integrity protection.

The PDCP integrity protection may thus be disabled dynamically in response to real time conditions of an DRB to reduce unnecessary consumption of resources.

Figure 8:
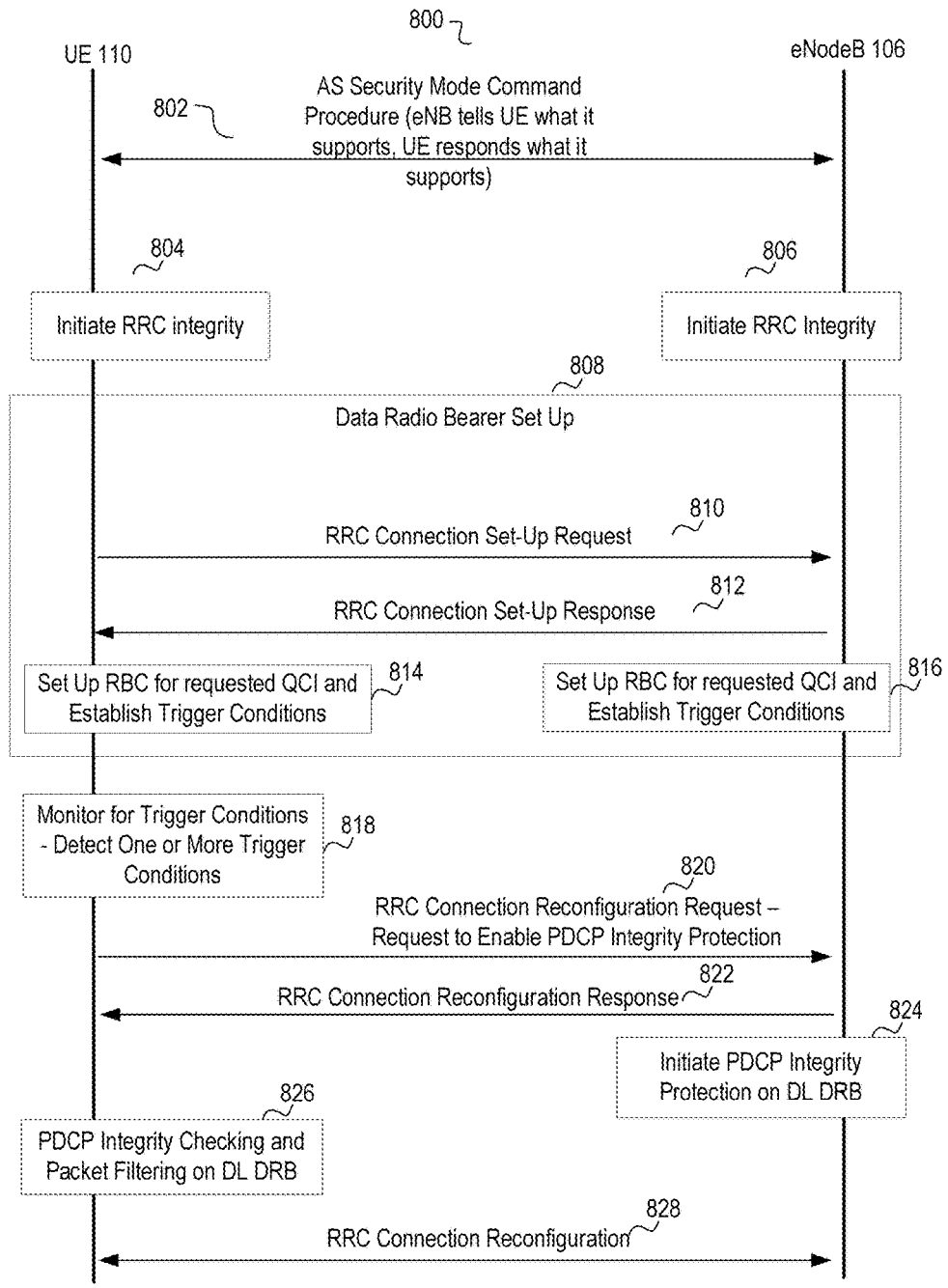
FIG. 8 illustrates a logical flow diagram of an embodiment of a method of signalling for PDCP integrity protection in a downlink data radio bearer.

Embodiment—Signalling to Enable/Disable
Integrity Protection in a Downlink (DL) DRB FIG. 8 illustrates a logical flow diagram of an embodiment of a method 800 of signalling for PDCP integrity protection. Signalling is required between two entities, such as UE 110 and eNodeB 106, to enable and disable integrity protection. For example, when a receiving entity detects trigger conditions to start PDCP integrity protection and filtering of unwanted packets, it needs to be communicated to the transmitting entity. In current 4G LTE networks, there is no dynamic signalling to support PDCP integrity protection of user data over a DRB. Encryption information is communicated between the UE and eNB only at radio bearer set-up through RRC connection configuration messages. In addition, user data over DRBs are not integrity protected in current LTE networks. Only RRC packets with control signalling are currently integrity protected over an DRB. And the integrity protection of control data in the RRC packets is statically enabled by the AS security mode command procedure.

Exemplary signalling is described herein for dynamic integrity protection of user plane data over a data radio bearer (DRB). In 802, the UE 110 and eNB 106 perform an Access Stratum (AS) security mode command (SMC) procedure to initiate current security procedures, as defined in 3GPP Technical Specification TS 33.401, Version 8.3.1, Section 7.2.4.5, dated March 2009 and entitled, "Security Architecture", which is hereby incorporated by reference herein. The AS SMC procedure includes a roundtrip of messages between eNB 106 and UE 110. The eNB 106 transmits an AS security mode command to the UE 110, and the UE 110 replies with the AS security mode complete message. If successful, the AS SMC procedure initiates RRC integrity protection by the UE 110 at 804 and the eNodeB 106 at 806. In RRC integrity protection, only RRC packets with control signaling include integrity protection. User plane data in PDCP PDUs are not integrity protected under current RRC integrity protection procedures. In 5G LTE networks, the Access Stratum (AS) security mode command (SMC) procedure negotiates an additional parameter for selection of an integrity algorithm for the user plane. This integrity algorithm may then be used for integrity protection when enabled for a DRB.

A data radio bearer (DRB) set-up is performed at 808. For example, the UE 110 initiates a data radio bearer set up for a particular application by transmitting an RRC connection Set-Up request at 810. An information element (IE) in the RRC Connection Setup request includes a requested QCI for the data radio bearer. The RRC Connection Setup request also includes the information element (IE) called drb-ToAddModList that includes PDCP configuration parameters as currently defined in 3GPP Technical Specification TS 36.331, Version 14.0, Section 5.3.10.3, dated October 2016 and entitled, "Radio Resource Control (RRC) Protocol Specification," which is hereby incorporated by reference herein. In addition to the currently defined parameters, additional parameters are included to enable or disable PDCP integrity protection. These additional parameters include the Radio Bearer id as well as parameters to indicate static or dynamic integrity protection for the DRB and Integrity Algorithm. The eNB 106 responds with a RRC Connection Set-Up response at 812. When static integrity protection is requested for the DRB, e.g. for the duration of the DRB, then integrity protection is enabled for the DRB at set-up.

When static integrity protection is not requested or otherwise signalled for the DRB, then the UE 110 and eNB 106 may default to dynamic static protection. Both the UE 110 at 814 and the eNB 106 at 816 then set up the data radio bearer for the requested QCI with dynamic integrity protection. The UE 110 and eNB 106 also establish the trigger conditions for the dynamic integrity protection. The trigger conditions may be communicated in the RRC Connection Set-Up messages. Alternatively, or in addition, the trigger conditions may be predefined based on the QCI of the DRB. For example, the UE 110 and eNB 106 may store a QCI-Trigger Condition table that associates trigger conditions to each QCI value. This table may be the same as Table 1 included herein with the Trigger conditions inserted as another column or a separate table or otherwise stored as configuration parameters.

In this embodiment of FIG. 8, the UE 110 is the receiver of PDCP PDUs for downlink radio bearers. In 818, the UE 110 monitors for trigger conditions. The UE 110 may perform monitoring of the PDCP PDUs at the PDCP layer, e.g. to determine whether the PDCP PDUs are conforming to a packet arrival rate for the QCI configured for the DRB. For example, if the packet arrival rate exceeds a threshold defined for the QCI of the DRB, the UE 110 transmits a request to the eNB 106 to enable PDCP integrity protection of the DRB at 820. The request may be included in an RRC Connection Reconfiguration Request. The UE 110 may monitor at lower layers for trigger conditions as well. For example, the respective channels or PDUs for the RLC sublayer 206, the MAC sublayer 204 and/or the physical layer 202 may be monitored by the UE 110 for trigger conditions.

When trigger conditions are detected, the UE 110 and eNB 106 exchange RRC Connection Reconfiguration messages for the particular data radio bearer (DRB) to initiate PDCP integrity protection. For example, in 820, an information element (IE) in the RRC Connection Reconfiguration Request message includes an indicator to start that the PDCP integrity protection by the eNB 106. The eNB 106 replies with an RRC Connection Reconfiguration Response at 822. The integrity algorithm indicated in the RRC Connection Setup Request message is then applied to the PDCP PDUs for the downlink (DL) DRB by the eNB 106 at 824.

The UE 110 receives PDCP PDUs with checksums generated from the PDCP integrity algorithm. The UE 110 starts PDCP integrity checking and packet filtering for the downlink (DL) data radio bearer at 826.

When the UE 110 detects that the integrity enablement conditions, such as spurious packet arrival, extra packets, varying size packets have gone away, RRC Connection reconfiguration is executed to inform the eNB 106 that, it is safe to disable the PDCP integrity protection and revert back to normal transmission without PDCP integrity protection at 828.

Figure 9:
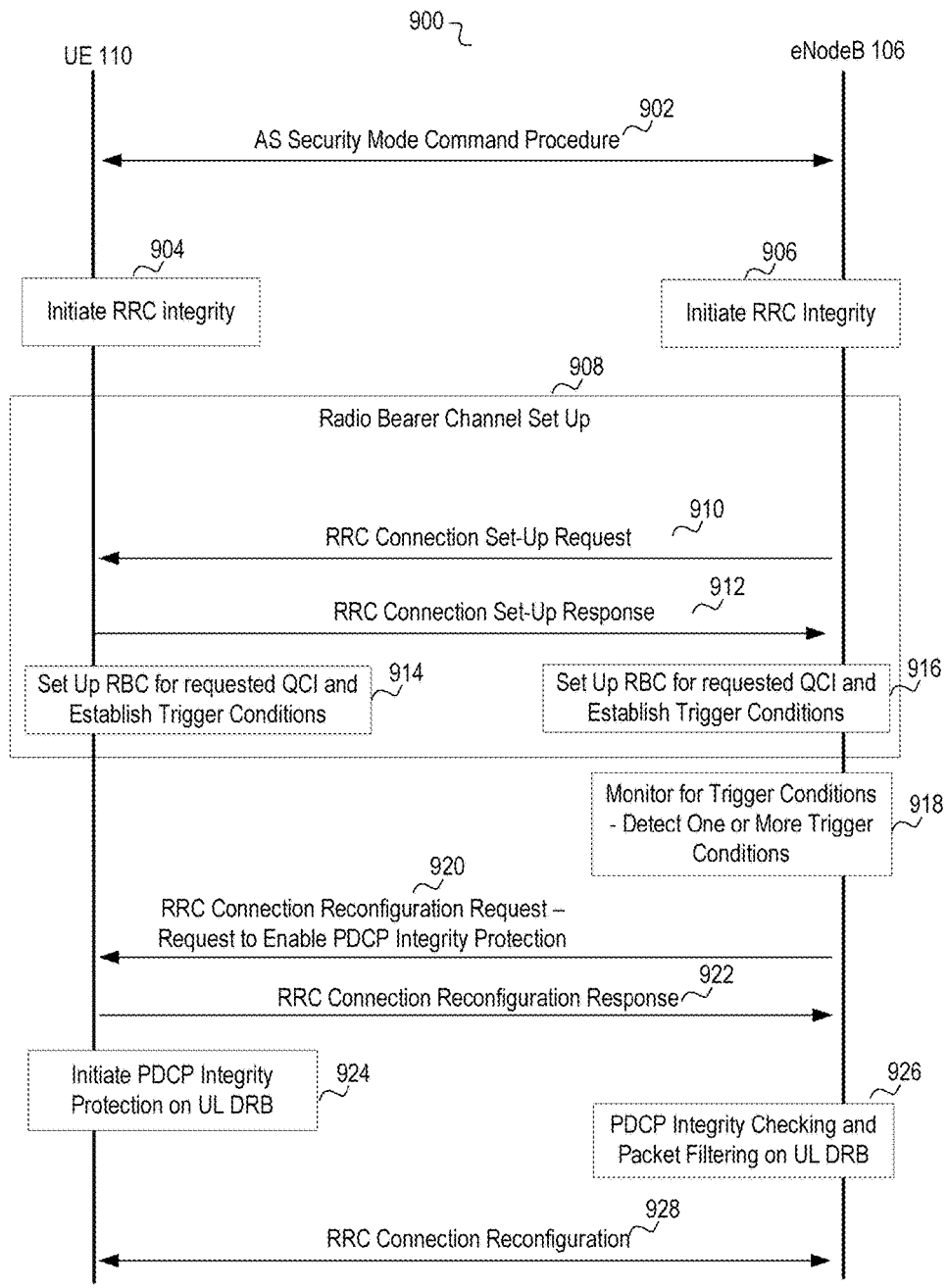
FIG. 9 illustrates a logical flow diagram of an embodiment of a method of signalling for PDCP integrity protection in an uplink data radio bearer.

Embodiment—Signalling to Enable/Disable Integrity Protection in an Uplink (UL) DRB FIG. 9 illustrates a logical flow diagram of an embodiment of a method 900 of signalling for PDCP integrity protection in an uplink data radio bearer. In 902, the UE 110 and eNB 106 perform an Access Stratum (AS) security mode command (SMC) procedure to initiate current security procedures. The eNB 106 transmits an AS security mode command to the UE 110, and the UE 110 replies with the AS security mode complete message. If successful, the AS SMC procedure initiates RRC integrity protection by the UE 110 at 904 and the eNodeB 106 at 906. In RRC integrity protection, only RRC packets with control signalling include integrity protection. User plane data in PDCP PDUs are not integrity protected under current RRC integrity protection procedures.

A data radio bearer (DRB) set-up is performed at 908. For example, the eNB 106 initiates a data radio bearer set up for a particular application by transmitting an RRC connection Set-Up request at 910. An information element (IE) in the RRC Connection Setup request includes a requested QCI for the data radio bearer. The RRC Connection Setup request also includes the information element (IE) called drb-ToAddModList that includes PDCP configuration parameters as currently defined in 3GPP Technical Specification TS 36.331, Version 14.0, Section 5.3.10.3, dated October 2016 and entitled, "Radio Resource Control (RRC) Protocol Specification," which is hereby incorporated by reference herein. In addition to the currently defined parameters, additional parameters are included to enable or disable PDCP integrity protection. These additional parameters include the Radio bearer id as well as parameters to indicate integrity protection and/or an Integrity Algorithm. The UE 110 responds with a RRC Connection Set-Up response at 912.

When static integrity protection is not requested or otherwise signalled for the DRB, then the UE 110 and eNB 106 may default to dynamic static protection for the DRB. Both the UE 110 at 914 and the eNB 106 at 916 then set up the data radio bearer for the requested QCI and also establish the trigger conditions for PDCP integrity protection. The trigger conditions may be communicated in the RRC Connection Set-Up messages. Alternatively, or in addition, the trigger conditions may be predefined based on the QCI of the DRB. For example, the UE 110 and eNB 106 may store a QCI-Trigger Condition table that associates trigger conditions to each QCI value. This table may be the same as Table 1 included herein with the Trigger conditions inserted as another column or a separate table or otherwise stored as configuration parameters.

In this embodiment of FIG. 9, the eNodeB 106 is the receiver of PDCP PDUs for the uplink data radio bearer. In 918, the eNodeB 106 monitors for trigger conditions. The eNodeB may perform monitoring of the PDCP PDUs at the PDCP layer, e.g. to determine whether the PDCP PDUs are conforming to a packet arrival rate for the QCI configured for the DRB. For example, if the packet arrival rate exceeds a threshold defined for the QCI of the DRB, the eNodeB 106 transmits a request to the UE 110 to enable PDCP integrity protection of the DRB at 920. The request may be included in an RRC Connection Reconfiguration Request. The eNodeB 106 may monitor at lower layers for trigger conditions as well. For example, the respective channels or PDUs for the RLC sublayer 206, the MAC sublayer 204 and/or the physical layer 202 may be monitored by the eNodeB 106 for trigger conditions.

When trigger conditions are detected, the UE 110 and eNB 106 exchange RRC Connection Reconfiguration messages for the particular data radio bearer (DRB) to initiate PDCP integrity protection. For example, in 920, an information element (IE) in the RRC Connection Reconfiguration Request message includes an indicator to start the PDCP integrity protection by the UE 110. The UE 110 replies with an RRC Connection Reconfiguration Response at 922. The integrity algorithm indicated in the RRC Connection Setup Request message is then applied to the PDCP PDUs for the uplink (UL) DRB by the UE 110 at 924.

The eNodeB 106 receives PDCP PDUs with checksums generated from the PDCP integrity algorithm. The eNodeB 106 starts PDCP integrity checking and packet filtering for the uplink (UL) data radio bearer at 926.

When the eNodeB 106 detects that the integrity enablement conditions, such as spurious packet arrival, extra packets, varying size packets have gone away, RRC Connection reconfiguration is executed to inform the UE 110 that, it is safe to disable the integrity protection and revert back to normal transmission without integrity protection at 928.

Figure 10:
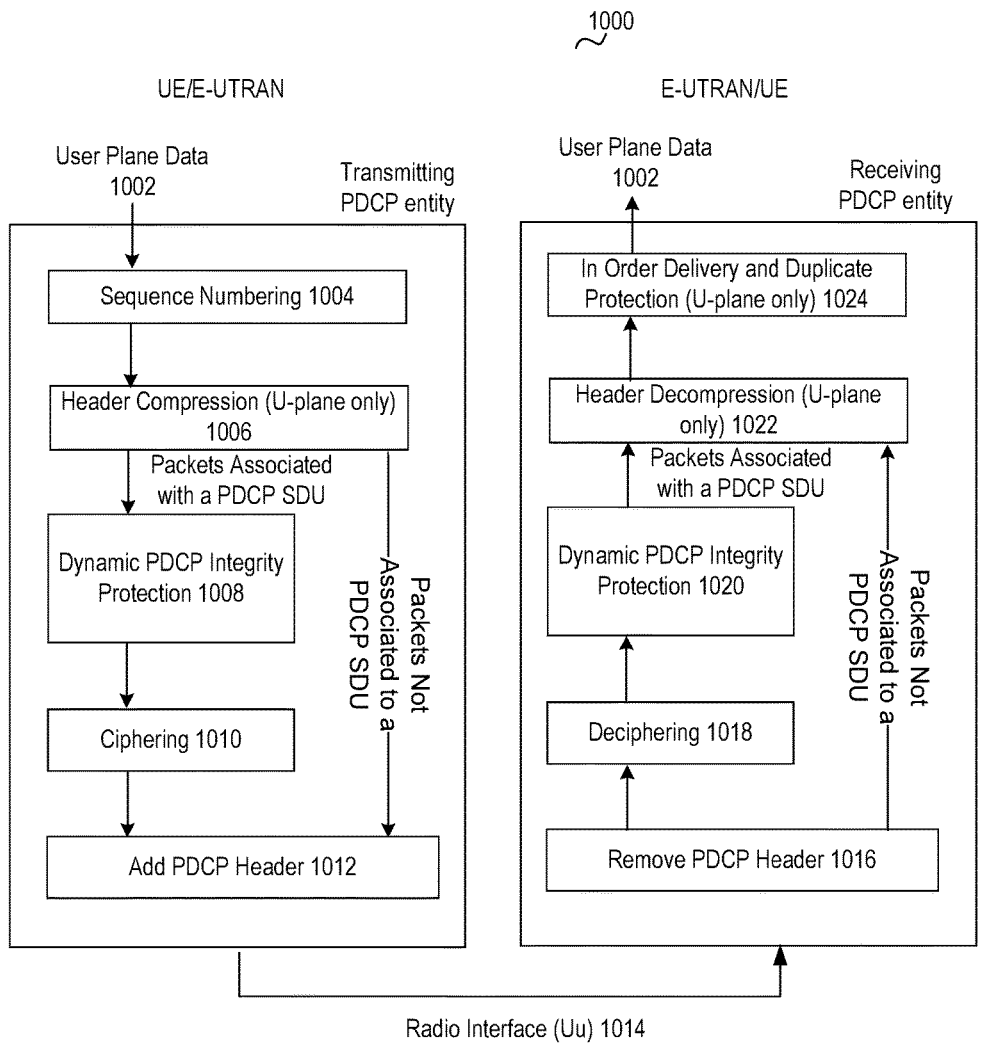
FIG. 10 illustrates a logical flow diagram of an embodiment of a method 1000 for PDCP integrity protection and verification at the PDCP layer for user plane data.

FIG. 10 illustrates a logical flow diagram of an embodiment of a method 1000 for PDCP integrity protection and verification at the PDCP layer for user plane data. In 1004, user plane data 1002 is first processed at the PDCP layer using a "Sequence Numbering" Procedure. A "Sequence Number" is added to each incoming data block of user plane data 1002. The sequence number helps the receiver to determine whether the data is being delivered in order, duplicate data, recombining the data, etc. Header compression is then performed at 1006. Header Compression is only performed on user plane data, e.g. IP packet headers. Control or signalling messages do not go through this Header Compression.

Integrity protection is then included with the PDCP PDUs when enabled as described herein at 1008. PDCP Integrity Protection provides a mechanism for the receiver to verify that the received PDCP PDU is the same PDCP PDU that the transmitter sent. For example, an integrity checksum may be used to verify the received message. In an embodiment, the LTE EIA integrity algorithms described in 3G TS 33.401, Annex B is implemented for the PDCP Integrity Protection, which is hereby incorporated by reference herein. The PDCP PDU then goes through a Ciphering process at 1010. The Ciphering process applies to both C-Plane and U-Plane Data. Eventually, a header is added at the PDCP layer at 1012. The PDCP PDU is then processed at lower sublayers and transmitted over the radio interface in a data radio bearer.

At the receive end, the lower layers process the received packets to generate a PDCP PDU. At the PDCP layer, the header is removed at 1016 and deciphering is performed at 1018. Dynamic PDCP integrity verification is performed at 1020. For example, an integrity checksum may be used to verify the received message, e.g. that the received PDCP PDU is the same PDCP PDU that sent by the transmitter. Unverified packets may be dropped or filtered. The verified packets are further processed by decompression of headers in 1022. The sequence numbers inserted at the transmission side are used to order the packets and detect any duplication at 1024. The user plane data 1002 is then retrieved and delivered to the receiving PDCP entity.

Certain embodiments described herein indicate that the integrity protection messaging is between the UE and the eNB 106 and terminates with the eNB 106. In other embodiments, the security procedures and signaling described herein may not be terminated at the eNB 106, but in another network node, such as in the User Plane Function (UPF) node or another network node, e.g. as defined in 3GPP TS 23.501, Version 0.3.0, dated February 2017 and entitled, "System Architecture for the 5G System," which is hereby incorporated by reference herein. In such embodiments, similar signaling and procedures as described herein are performed between the UE and the UPF node or other network node. However, in such a case, instead of RRC connection type messages and procedures, control plane messages between the UE 110 and the UPF node are exchanged. Such control plane messages include similar information as described herein, e.g. to enable and disable dynamic integrity protection of user plane data.

Figure 11:
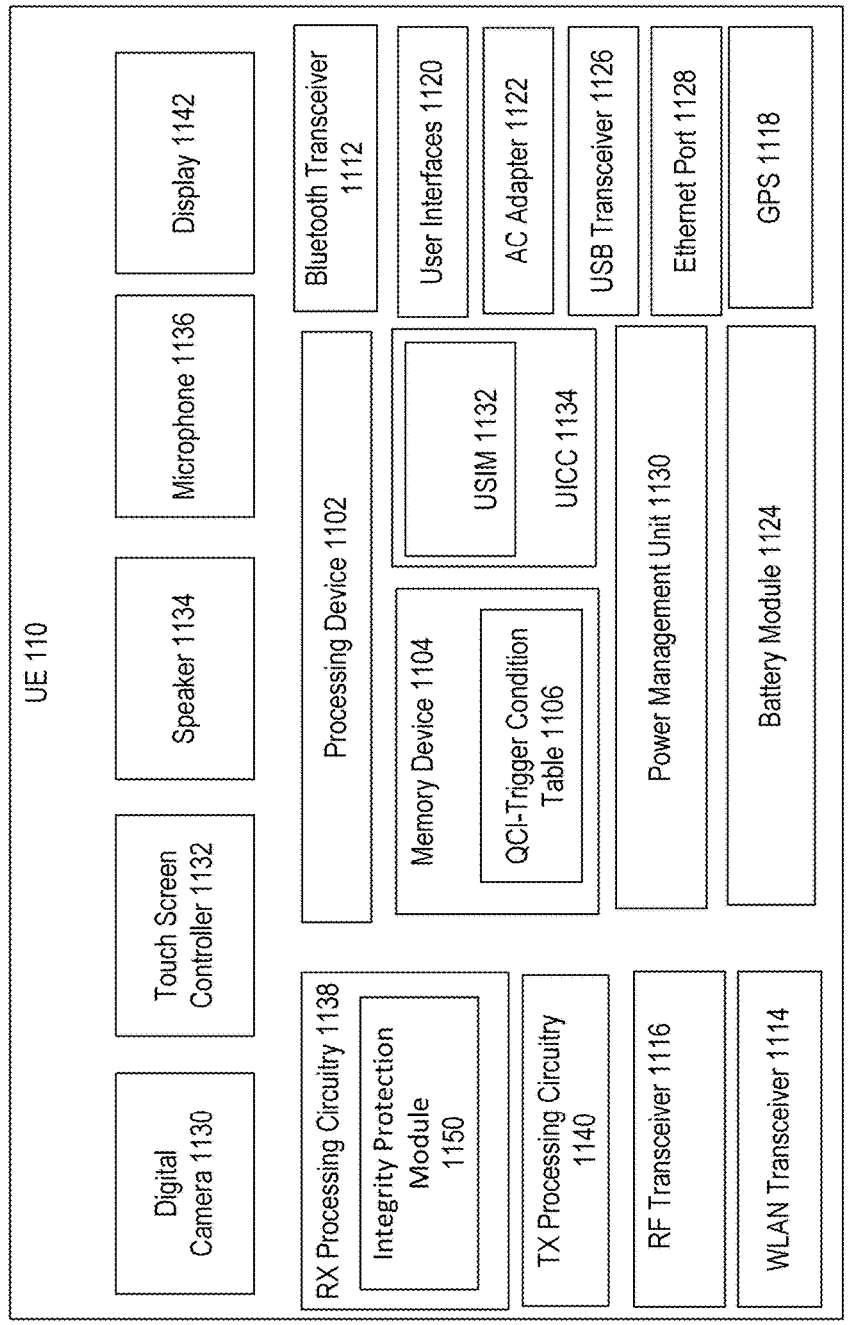
FIG. 11 illustrates a schematic block diagram of an embodiment of user equipment (UE).

FIG. 11 illustrates a schematic block diagram of an embodiment of user equipment (UE) 110. The UE 110 may include a phone, tablet, watch, laptop, or other type of user processing device. The UE 110 described herein is for illustrative purposes only. The UE components are exemplary and additional or alternative components and functions may be implemented. In addition, one or more of the functions or components shown herein may not be present or may be combined with other components or functions.

The UE 110 includes a processing device 1102 and a memory device 1104 that stores operational instructions that when performed by the processing device 1102 may perform one or more of the functions described herein with respect to the UE 110. The memory device 1104 may include a QCI-Trigger Condition Table 1106 that stores trigger conditions associated with QCI values. In addition, the UE 110 may also include a UICC 1134 that includes a USIM 1132.

The UE 110 may further include a Bluetooth transceiver 1112, a WLAN (IEEE 802.11x compliant) transceiver 1114, and global positioning satellite (GPS) transceiver 1118. The WLAN transceiver 1114 may operate as a non-3GPP access interface to a WLAN network. The UE 110 also includes an RF transceiver 1116 compliant with Universal Mobile Telecommunications System (UMTS) Terrestrial Radio Access Network (UTRAN), Long Term Evolution (LTE) Evolved UTRAN (E-UTRAN), LTE-Advanced (LTE-A) or other wireless network protocols. The UE 110 includes RX processing circuitry 1138 and TX processing circuitry 1140. The RX processing circuitry 1138 includes an integrity protection module 1150 that is configured to perform one or more functions described herein with respect to the PDCP integrity protection. For example, the RX processing circuitry 11130 may include one or more processing devices or memory devices that store operational instructions that when performed by the one or more processing devices may perform one or more of the functions described herein with respect to PDCP integrity protection.

The UE 110 may further include user interfaces 1120, AC adapter 1122, battery module 1124, USB transceiver 1126 and Ethernet Port 1128. The UE 110 may further include one or more user applications, such a digital camera 1130, touch screen controller 1132, speaker 1134, microphone 1136 or display 1142. The UE 110 may also include a power management unit 1130. One or more internal communication buses (not shown) may communicatively couple one or more of the components of the UE.

Figure 12:
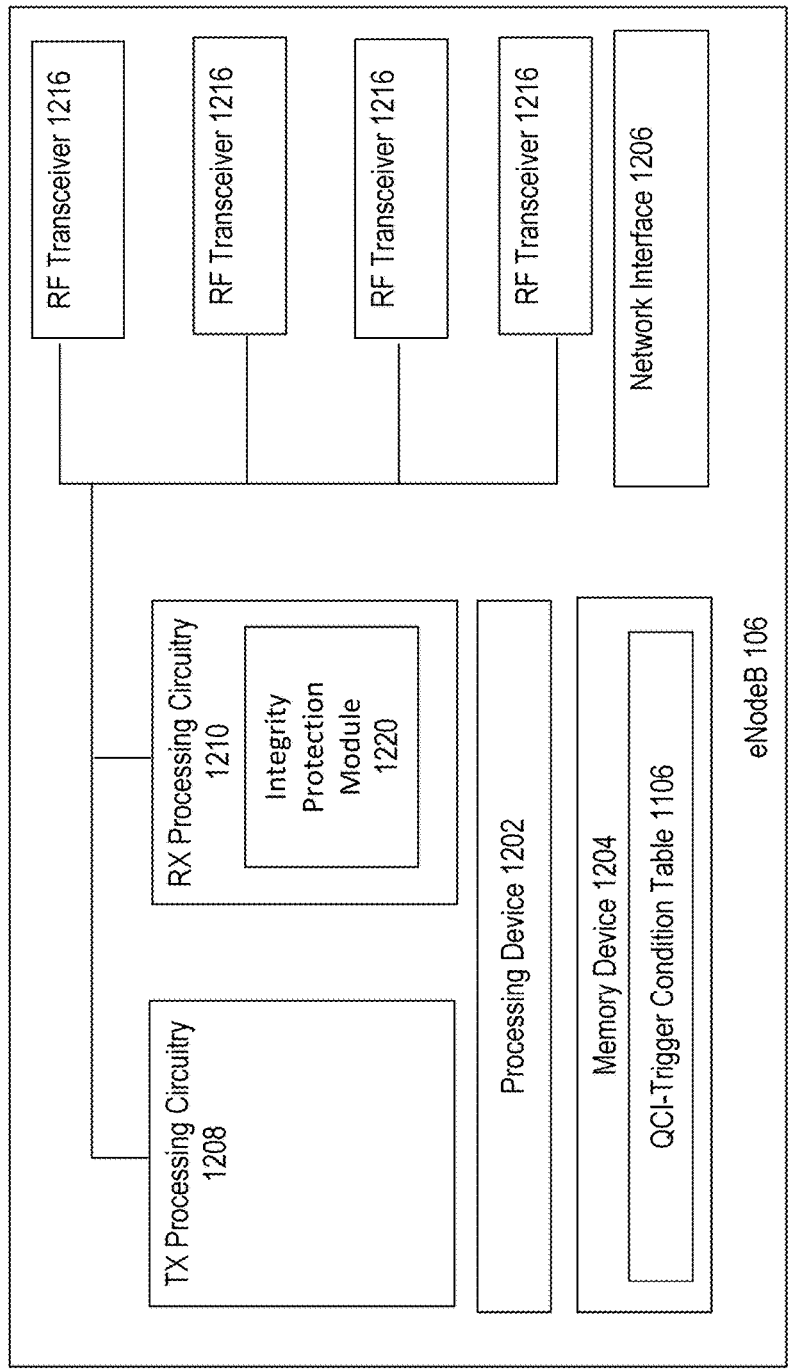
FIG. 12 illustrates a schematic block diagram of an embodiment of an exemplary eNodeB.

FIG. 12 illustrates a schematic block diagram of an embodiment of an exemplary eNodeB 106. The eNodeB 106 described herein is for illustrative purposes only. One or more of the functions or components shown herein may not be present or may be combined with other components or functions. Additional components or functions may also be included. The eNodeB 106 includes a processing device 1202 and a memory device 1204 that stores instructions that when performed by the processing device 1202 may perform one or more of the functions described herein with respect to the eNodeB 106. The memory device 1204 may include a QCI-Trigger Condition Table 1106 that stores trigger conditions associated with QCI values.

The eNodeB 106 includes multiple RF transceivers 1216, transmit (TX) processing circuitry 1208, and receive (RX) processing circuitry 1210. The eNodeB 106 also includes a network interface 1206 for communicating with other eNodeBs 106 and core network nodes (such as an MME 116 or S-GW 118).

The RF transceivers 1216 receive incoming RF signals, such as signals transmitted by UEs 110, in the network 100. The RF transceivers 1216 down-convert the incoming RF signals to generate IF or baseband signals. The IF or baseband signals are sent to the RX processing circuitry 1212, which generates processed baseband signals by filtering, decoding, and/or digitizing the baseband or IF signals. The RX processing circuitry 1210 transmits the processed baseband signals to the processing device 1202 for further processing. The RX processing circuitry 1210 includes an integrity protection module 1220 that is configured to perform one or more functions described herein with respect to the PDCP integrity protection.

The TX processing circuitry 1208 receives analog or digital data from the processing device 1202. The TX processing circuitry 1208 encodes, multiplexes, and/or digitizes the outgoing baseband data to generate processed baseband or IF signals. The RF transceivers 1216 receive the outgoing processed baseband or IF signals from the TX processing circuitry 1208 and up-converts the baseband or IF signals to RF signals that are transmitted via antennas.

The dynamic PDCP integrity protection described herein for user plane data provides integrity protection based on real time conditions or detected potential attacks. The embodiments described herein define appropriate trigger conditions to enable the integrity protection based on radio bearer characteristics, such as QCI values. The embodiments also disable PDCP integrity protection dynamically to more optimally control consumption of resources.

A processing device as described herein includes at least one processing device, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory device may be a single memory device or a plurality of memory devices. The memory device may be one or more of a read-only memory, random access memory, volatile memory, non-volatile memory, static memory, dynamic memory, flash memory, cache memory, and/or any non-transitory memory device that stores digital information.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. User equipment (UE), comprising:
a wireless transceiver configured to communicate with a network node; and
processing circuitry including at least one processing device and at least one memory device, wherein the processing circuitry is configured to:
establish a data radio bearer (DRB) with the network node for wireless communication of user plane data over the DRB;
determine whether to enable static integrity protection for the DRB for a duration of the DRB;
when static integrity protection is determined, enable integrity protection for a duration of the DRB; and
when static integrity protection is not determined, establish one or more trigger conditions for dynamic integrity protection of the DRB.

2. The UE of claim 1, wherein the processing circuitry is configured to:
determine to enable dynamic integrity protection of the DRB;
detect at least one of the trigger conditions in the DRB;
transmit a request for integrity protection of the DRB from the network node; and
receive the user plane data over the DRB, wherein the integrity protection has been applied to the user plane data.

3. The UE of claim 2, wherein the processing circuitry is further configured to:
monitor the DRB for the at least one of the trigger conditions;
determine the at least one of the trigger conditions has subsided for a predetermined time period; and
transmit a request to the network node for disablement of the integrity protection of the DRB.

4. The UE of claim 3, wherein the processing circuitry is configured to determine one or more trigger conditions for dynamic integrity protection of the DRB by:
determining at least one characteristic of the DRB; and
establishing the trigger conditions based on the at least one characteristic of the DRB.

5. The UE of claim 4, wherein the at least one characteristic includes a quality of service class identifier.

6. The UE of claim 4, wherein the processing circuitry is further configured to:
establish a first trigger condition that includes a packet arrival rate threshold, wherein the packet arrival rate threshold is based on the quality of service class identifier of the DRB.

7. User equipment (UE), comprising:
a wireless transceiver configured to communicate with a network node; and
processing circuitry including at least one processing device and at least one memory device, wherein the processing circuitry is configured to:
establish a data radio bearer (DRB) with the network node for wireless communication of user plane data over the DRB, wherein one or more trigger conditions are associated with the DRB;
transmit the user plane data over the DRB;
receive a request for integrity protection of the DRB from the network node;
apply an integrity protection algorithm to the user plane data; and
transmit the user plane data including the integrity protection over the DRB to the network node.

8. The UE of claim 7, wherein the processing circuitry is further configured to:
receive a request for disabling the integrity protection of the DRB from the network node;
disable the integrity protection of the user plane data; and
transmit the user plane data over the DRB to the network node.

9. The UE of claim 8, wherein the processing circuitry is further configured to apply an integrity protection algorithm to the user plane data by:
receiving the user plane data in one or more internet protocol packets;
applying the integrity protection algorithm to the user plane data by calculating a checksum and including the checksum with the user plane data; and
generating at least one packet data convergence plane (PDCP) packet data unit (PDU) including the user plane data with the checksum.

10. A network node, comprising:
a wireless transceiver configured to communicate with a user equipment (UE); and
processing circuitry including at least one processing device and at least one memory device, wherein the processing circuitry is configured to:
set up a data radio bearer (DRB) with the UE for wireless communication of user plane data over the DRB, wherein DRB has an associated one or more trigger conditions for dynamic integrity protection of the DRB;
monitor the DRB for one or more of the trigger conditions;
detect at least one of the trigger conditions in the DRB;
transmit a request to the UE for integrity protection of the DRB;
receive the user plane data over the DRB, wherein the integrity protection has been applied to the user plane data;
determine that the at least one of the trigger conditions has subsided for a predetermined time period for the DRB; and
transmit a request to the UE for disablement of the integrity protection of the DRB.

11. The network node of claim 10, wherein the processing circuitry is configured to determine one or more trigger conditions for dynamic integrity protection of the DRB by:
determining at least one characteristic of the DRB, wherein the at least one characteristic includes a quality of service class identifier; and
establishing the trigger conditions based on the at least one characteristic of the DRB.

12. The network node of claim 11, wherein the processing circuitry is further configured to:
   establish a first trigger condition that includes a threshold for a packet arrival rate, wherein the threshold for the packet arrival rate is based on the quality of service class identifier of the DRB.

13. The network node of claim 10, wherein the processing circuitry is further configured to:
   establish another data radio bearer (DRB) with the network node for wireless communication of user plane data over the another DRB;
   indicate a static integrity protection of the another DRB; and
   receive the user plane data over the another DRB, wherein the integrity protection has been applied to the user plane data.

14. The network node of claim 10, wherein the network node includes at least one of: an eNodeB or network node with user plane function (UPF).

15. A network node, comprising:
   a wireless transceiver configured to communicate with user equipment (UE); and
   processing circuitry including at least one processing device and at least one memory device, wherein the processing circuitry is configured to:
      establish a data radio bearer (DRB) with the UE for wireless communication of user plane data over the DRB, wherein one or more trigger conditions are associated with the DRB;
      transmit the user plane data over the DRB;
      receive a request for integrity protection of the DRB from the UE;
      apply an integrity protection algorithm to the user plane data; and
      transmit the user plane data including the integrity protection over the DRB to the UE.

16. The network node of claim 15, wherein the processing circuitry is further configured to:
   receive a request for disabling the integrity protection of the DRB from the UE;
   disable the integrity protection of the user plane data; and
   transmit the user plane data over the DRB to the network node.

17. The network node of claim 16, wherein the processing circuitry is further configured to apply an integrity protection algorithm to the user plane data by:
   receiving the user plane data in one or more internet protocol packets;
   applying the integrity protection algorithm to the user plane data by calculating a checksum and including the checksum with the user plane data; and
   generating at least one packet data convergence plane (PDCP) packet data unit (PDU) including the user plane data with the checksum.

18. The network node of claim 15, wherein the processing circuitry is further configured to:
   establish another data radio bearer (DRB) with the UE for wireless communication of user plane data over the another DRB;
   indicate a static integrity protection of the another DRB;
   apply an integrity protection algorithm to the user plane data by calculating a checksum and including the checksum with the user plane data; and
   generating at least one packet data convergence plane (PDCP) packet data unit (PDU) including the user plane data with the checksum.

19. The network node of claim 18, wherein the processing circuitry is further configured to:
   apply the integrity protection algorithm to the user plane data for a duration of the DRB with the UE.

* * * * *